US007916139B2

(12) United States Patent
Murray et al.

(10) Patent No.: US 7,916,139 B2
(45) Date of Patent: Mar. 29, 2011

(54) IMAGING VOLUME DATA

(75) Inventors: Benjamin Alan Kerr Murray, Edinburgh (GB); Pavlos Papageorgiou, Edinburgh (GB); Andrew Michael Christian Smout, Edinburgh (GB)

(73) Assignee: Toshiba Medical Visualization Systems Europe, Limited, Edinburgh (GB)

( * ) Notice: Subject to any disclaimer, the term of this patent is extended or adjusted under 35 U.S.C. 154(b) by 349 days.

(21) Appl. No.: 11/571,549

(22) PCT Filed: May 18, 2005

(86) PCT No.: PCT/GB2005/001947
§ 371 (c)(1),
(2), (4) Date: Jun. 17, 2008

(87) PCT Pub. No.: WO2006/003358
PCT Pub. Date: Jan. 12, 2006

(65) Prior Publication Data
US 2008/0246768 A1    Oct. 9, 2008

(30) Foreign Application Priority Data

Jun. 30, 2004 (GB) .................................. 0414685.8

(51) Int. Cl.
*G06T 15/10* (2006.01)
(52) U.S. Cl. ...................................................... 345/427
(58) Field of Classification Search .................. None
See application file for complete search history.

(56) References Cited

U.S. PATENT DOCUMENTS 5,787,889 A    8/1998    Edwards et al.
(Continued)

FOREIGN PATENT DOCUMENTS

EP    1089225    4/2001
(Continued)

OTHER PUBLICATIONS

Pfister H et al:, "VolumePro real-time ray-casting system," Computer Graphics. Siggraph 99 Conference Proceedings. Los Angeles, CA, Aug. 13, 1999, Computer Graphics Proceedings Siggraph, NewYork. NY: ACM, US Aug. 8, 1999, pp. 251-260, XP00223546:3, ISBN: 0-201-48560-5.

(Continued)

*Primary Examiner* — Said Broome
(74) *Attorney, Agent, or Firm* — Renner, Otto, Boisselle & Sklar, LLP

(57) ABSTRACT

A method and apparatus for generating a two-dimensional output image of a slab multi-planar reformatting (MPR) volume data set from a selectable view point and view direction is described. The method comprises factorizing a view transform matrix into an intermediate transform matrix and a warp transform matrix. The intermediate transform matrix is such that voxels in the volume data set map to pixels in an intermediate image in which neighboring voxels in a plane of the volume data set which is most parallel to tie plane of the output image are separated by an integer number of pixel along each of tie axes of the intermediate image. The intermediate transform matrix is applied to the data set to provide an intermediate data set. A projection of the intermediate data set along the view direction is performed according to a desired projection algorithm to provide the intermediate image. The wrap transform matrix is then applied to the intermediate image to provide the output image.

12 Claims, 8 Drawing Sheets

U.S. PATENT DOCUMENTS

| | | | |
|---|---|---|---|
| 5,986,662 A * | 11/1999 | Argiro et al. | 345/424 |
| 6,359,619 B1 | 3/2002 | Waters et al. | |
| 6,370,413 B1 * | 4/2002 | Alvarez et al. | 600/407 |
| 6,658,080 B1 | 12/2003 | Poole et al. | |
| 2004/0249809 A1 * | 12/2004 | Ramani et al. | 707/4 |
| 2005/0122343 A1 * | 6/2005 | Bailey et al. | 345/619 |
| 2005/0184988 A1 * | 8/2005 | Yanof et al. | 345/424 |

FOREIGN PATENT DOCUMENTS

| | | |
|---|---|---|
| EP | 1209620 | 5/2002 |
| GB | 2395880 | 2/2004 |
| JP | 2001-14490 | 1/2001 |
| WO | 03/088152 | 10/2003 |

OTHER PUBLICATIONS

Drebin R A et al:, "Volume rendering", Computer Graphics, New York, NY, US, vol. 22, No. 4, Aug. 1988, pp. 65-74, XP002982696, ISSN: 0097-8930.

"Fast Volume Rendering Using A Shear-Warp Factorization of the Viewing Transformation", Philippe G. Lacroute, Technical Report: CSL-TR-95-679, Sep. 1995, Computer Systems Laboratory Departments of Electrical Engineering and Computer Science, Stanford University.

Office Action issued in the corresponding Japanese Application No. 2007-518671 mailed Nov. 30, 2010 and English translation thereof.

* cited by examiner

IMAGING VOLUME DATA

This application is a national phase of International Application No. PCT/GB2005/001947 filed May 18, 2005 and published in the English language.

BACKGROUND OF THE INVENTION

The invention relates to imaging three-dimensional (3D) volume data. In particular, the invention relates to imaging of the 3D volume data with respect to a desired viewpoint and view direction.

The process of calculating two-dimensional (2D) images of 3D objects is often referred to as volume rendering. Volume rendering finds applications in many fields. One such field is the rendering of medical volume data resulting, for example, from the scanning of the human or animal body using computed tomography (CT) and other X-ray scanners, nuclear magnetic resonance scanners and ultrasound scanners, to name but a few examples.

The volume data generated by modern scanning equipment can be very detailed and complex to interpret. A physician may wish to render the data using different view directions and from different positions with respect to the scanned object in order to be able to analyse the scanned object and to detect, for example, abnormalities.

Various techniques are known for rendering 3D volume data to provide 2D images. Some of these are described by Lacroute [1]. These techniques commonly include projecting the volume data onto an image plane perpendicular to a desired view direction. This is often achieved by applying a coordinate transform to the volume data (to effect a change in view direction) and a projection of the transformed data along a line-of-sight onto the view plane (to form the 2D image). Coordinate transforms are generally made by applying a so-called view transform matrix. The projection of the transformed volume data can be made in a number of ways depending on the desired appearance of the final image.

In some rendering algorithms, the view transform matrix is factorised into two components. One such technique is known as shear-warp factorisation. Examples of this technique are described by Lacroute and in U.S. Pat. No. 5,787,889 [2]. In this approach, a view transform matrix is factorised into a 3D shear transform that is parallel to slices of a reference volume and a 2D warp transform to produce a projection of the sheared volume. This technique allows for faster and more efficient volume rendering algorithms.

Volume rendering techniques, such as applied to slab multi-planar reformatting (MPR) (sometimes referred to as MPR with thickness, or thick MPR), often lead to undesirable artefacts appearing in resulting 2D images. These artefacts are visually distracting and can hinder the interpretation of the images. In some situations the artefacts could be mistaken for real features of the volume data or in other cases could obscure real features of the data. Artefacts can also have a deleterious effect on subsequent image processing. For example, the accuracy of edge-detection algorithms is often very sensitive to the presence of image artefacts.

FIG. 1A schematically shows a medical image having an artefact which occurs in some situations with known MPR rendering techniques. The image of FIG. 1A is derived from an MPR slab through the torso of a human patient. A section through the patient's spine and ribcage can be seen. The ribcage encloses a number of the patient's organs. The patient's liver can be seen towards the upper-left region of the image. In this example, the artefact appears as a hatch pattern across the extent of the liver. This hatch pattern is undesirable as it is visually distracting and can obscure structures in the volume data which have a size comparable to the scale of the hatching. Some types of tumour can have a granular structure which can be obscured by the hatching, for example.

The image corresponds to a display of 2D image data generated from 3D volume data (i.e. a volume data set). In this example, the volume data are CT volume data derived from an X-ray CT scan of the patient. However, a similar artefact is seen in images derived from volume data from other imaging modalities. The volume data comprise a plurality of voxels arranged in a 3D grid. Each voxel has a voxel value associated with it. The voxel values represent measurements of a physical parameter of the patient. In this example, the voxel values represent an opacity of the patient's tissue to X-rays, and is measured in Hounsfield units (HU). This is very closely correlated with density (mass per unit volume). The volume data therefore correspond to the variation of density throughout the imaged part of the patient's torso.

The volume data are aligned with three orthogonal axes I, J and K having a common origin at one corner of the volume data. However, it will be appreciated that this choice of origin is arbitrary. These axes define a volume space. A volume-space coordinate system is used to identify the location of each voxel in volume space. The volume-space coordinate system has unit (or basis) vectors i, j and k which are aligned with respective ones of the orthogonal axes I, J and K. The unit vectors i, j and k are defined such that the voxels are of unit length along each of the axes in volume space. That is to say, the separation between voxels (i.e. the distance between their centres) along each axis is unity.

The 2D image-data comprise a plurality of image-pixels arranged in a 2D grid. Although the image itself is 2D, it is helpful to define a 3D view space containing the image. View space is defined by three orthogonal axes X, Y, Z having a common origin at one corner of the image. Again, the choice of origin is arbitrary. The X- and Y-axes are in the plane of the image (the image plane) and are aligned with the 2D grid of image pixels. The Z-axis is aligned parallel with the view direction (i.e. perpendicular to the image plane). A view-space coordinate system is defined to identify the location of each voxel and each image pixel in view space. The view-space coordinate system has unit, or basis, vectors x and y in the image plane and z along the view direction. The unit vectors x and y are defined such that the image pixels are of unit length along each of the axes in view space.

The image shown in FIG. 1A is generated from the volume data using a conventional slab multi-planar reformatting (MPR) technique. This technique involves applying a view transform matrix to effect a coordinate transform for the volume data from volume space to view space. The volume data transformed to view space are often referred to as MPR data, or as an MPR slab. The MPR slab comprises a series of MPR slices which are aligned parallel to the image plane and disposed at different positions along the Z-axis. It will be appreciated that often only a subset of the volume data, for example volume data extending over a selected region in volume space, will be processed. For example, a user may identify a region containing an organ of interest with only volume data from this region being subsequently rendered.

The 2D image is formed by projecting (collapsing) the MPR slab along the view direction onto the image plane. This is done according to a projection algorithm. The projection algorithm used in any particular case will depend on the desired appearance of the final image. One commonly used projection algorithm, and the one used for the image shown in FIG. 1A, is to determine for each image-pixel the maximum voxel value seen in the MPR slab along the Z-axis for the XY-coordinate corresponding to that image pixel. This is known as maximum intensity projection. Maximum intensity projection is a type of ray casting. In effect, for each pixel in the image, an imaginary ray is cast through the volume data parallel to the view direction. The image data for each pixel is then taken to be the maximum voxel value encountered by the ray as it traverses the MPR slab. Another projection algorithm known as minimum intensity projection is similar, but uses the minimum voxel value encountered by rays traversing the MPR slab for the image data instead of the maximum.

It will be appreciated that in some cases, only voxels having a voxel value in a selected range, or "window" will be of interest. For example, to reveal soft tissue on a CT scan, only voxel values in the range −200 to 500 HU may be of interest. To achieve such a view, a maximum or minimum intensity projection MPR image is typically calculated as described above, and subsequently the image is post-processed to enhance the contrast of voxel values in the desired range and suppress contrast outside that range.

The hatch artefact seen in the image shown in FIG. 1A has been found to be more apparent in some situations than in others. In addition, the nature of the artefact, i.e. the scale (periodicity) and intensity of the hatching has been found to be sensitive to view point and view direction.

FIGS. 1B, 1C and 1D schematically show images derived from the same volume data as that used for the image of FIG. 1A. However, these images have been rendered from different directions.

FIG. 1B corresponds to a zoom of approximately 110% compared to the image of FIG. 1A. The characteristic periodicity of the hatch artefact seen on the liver in FIG. 1B can be seen to have reduced by several times.

FIG. 1C corresponds to a rotation of view-space around the view direction by about 5° compared to the image shown of FIG. 1A. The hatch artefact is also apparent across the liver shown in FIG. 1C.

FIG. 1D corresponds to a rotation of view-space around the view direction by about 7°, i.e. a relative rotation of around 2° compared to the image shown in FIG. 1C. For these viewing conditions, the characteristic periodicity of the hatch artefact across the liver seen in FIG. 1D is significantly smaller than that seen in FIG. 1C.

This sensitivity of the artefact's appearance to changes in viewing conditions exacerbates its distracting effects. This is particularly so where, for example, a user wishes to animate a series of images which correspond to different view directions, or to continuously rotate, zoom or pan an image.

The artefact has been found to be most apparent when one or more of the following conditions apply:
- the volume data includes significant variations (real or noise) occurring on a spatial scale comparable to, or smaller than, the voxel size;
- only a narrow window of voxel values are to be included in the projection, for example to isolate soft tissue from surrounding tissues;
- the MPR slab has a significant extent along the view direction
- maximum (or minimum) intensity projection is used;
- the image plane (parallel to planes of the MPR slices in the MPR slab) is parallel, or closely parallel, to a plane containing a pair of axes of the volume-space coordinate system;
- the image is scaled (zoomed) by a non-integer factor; and/or the rotation of view-space around the view direction is such that rows of voxels in the volume data do not project onto rows of pixels in the output image (i.e. the rotation is not exactly 0°, 90°, 180° or 270°).

SUMMARY OF THE INVENTION

To address the problem of the hatch artefact appearing in rendered images, the first technical difficulty is to determine its cause. The inventors have identified the artefact as arising from the sampling of the discretised volume data for each pixel in the image during the rendering process, as now described.

FIG. 2 schematically shows a section of one slice of an MPR slab formed during the process of rendering volume data to create images of the kind shown in FIGS. 1A-D using conventional techniques. The section of the MPR slab shown in FIG. 2 relates to a 9×9 pixel section of the output image. As noted above, the MPR slice is parallel to the XY-plane in view space. This is also the plane of FIG. 2. The X- and Y-axes associated with the image plane are marked in the figure. The Z-axis associated with the view direction is perpendicular to the plane of the figure. In this example, the view direction is also parallel to the K-axis in volume space (i.e. the IJ-plane in volume space is parallel to the image plane). The image includes a 110% zoom and has a slight rotation about the K-axis. 110% zoom corresponds to a unit vector in volume space (i.e. the linear extent of a voxel) mapping to a vector of length 1/1.1 in view space.

The dotted lines in FIG. 2 connect between voxel centres. Accordingly, the crossing points of the dotted lines identify the locations of the voxel centres. The open circles in FIG. 2 identify the locations at which imaginary rays cast from the centres of image-pixels pass through the MPR slice during the maximum intensity projection step of the rendering process.

It can be seen that some rays, e.g. Rays A, B, C, D, E and F pass close to voxel centres, whereas other rays, e.g. Rays P, Q, R, S, T and U pass away from voxel centres. Where a ray passes through the centre of a voxel, the voxel value associated with that voxel may be used when determining the projection of the MPR slab onto the image plane. Where a ray does not pass through the centre of a voxel, however, an interpolated voxel value is used. For example, for Ray R which passes almost equidistantly from four voxel centres, the average of these four voxel values might be used. In general, a voxel value used for a particular ray passing through the MPR slice will be interpolated from the surrounding voxel values using a weighting based on the separation between the ray and the voxel centres. For example, a bi-linear interpolation between the four surrounding voxels in the MPR slice is often used.

As noted above, the view direction is parallel to an axis of the volume data grid. This means rays which pass through a voxel centre in the MPR slice shown in FIG. 2 will also pass through, or close to, voxel centres in other slices in the MPR slab. Similarly, rays which pass away from the voxel centres in the MPR slice shown in FIG. 2 will pass away from voxel centres in other slices. Accordingly, the maximum intensity projection calculated for Ray A will be based on the maximum of a sample of actual voxel values, but the maximum intensity projection calculated for Ray R will be based on the maximum of a sample of interpolated voxel values. In general, the maximum of a sample of actual voxel values will be greater than the maximum of a sample of interpolated voxel values. This is because the process of interpolation tends to average out extremes in a sample. Because of this, the maximum intensity projection image data calculated for Ray A will typically be greater than that calculated for Ray R. This means the image-pixel associated with Ray A will be brighter than the one associated with Ray R. This is so even where Ray A and Ray R pass through regions of volume data having similar intensities and variances.

This is the effect which gives rise to the hatch artefact in the images. The repeating hatch pattern is due to rays periodically passing close to and then away from voxel centres on moving through the image. This provides for a spatial beat frequency which is associated with the scale of the hatching. The 9×9 pixel example shown in FIG. 2 spans only a single period of the beat frequency. Accordingly, the artefact in FIG. 2 would appear as a dark centre to the image with a bright surround in a maximum intensity projection image.

Corresponding effects arise with other projection techniques. For example, were minimum intensity projection to be used with the configuration shown in FIG. 2, the image-pixel associated with Ray A would be darker than the one associated with Ray R.

To solve the above identified hatch artefact problem, a first aspect of the invention provides a method of generating a two-dimensional output image of a volume data set from a selectable view point and view direction in a slab multi-planar reformatting (MR) rendering process, the method comprising: providing a slab MPR volume data set comprising voxels arranged in rows along first, second and third directions; and projecting the volume data set along the view direction to form an intermediate image having pixels arranged along first and second intermediate-image axes in which the projection of neighbouring voxels along two of the first, second and third directions are separated by respective integer numbers of pixels; and applying a warp mapping transform to transform the intermediate image to the output image.

Because the spacing between voxel centres along two of the directions in the volume data set corresponds an integer number of pixels along respective ones of the axes in the intermediate image, rays cast from the intermediate image through the volume data set pass consistent distances from voxel centres. This means the hatch artefact identified by the inventors as being due to irregular sampling of the voxel data during the projecting which occurs with conventional rendering techniques does not appear in the intermediate image. Because of this, the hatch like artefact also does not occur in the output image.

The step of projecting the volume data set along the view direction may comprise determining an intermediate mapping transform for transforming the volume data set to an intermediate volume data set in which the voxels are arranged in rows running parallel to the first intermediate-image axis, the second intermediate-image axis and the view direction; applying the intermediate mapping transform to the volume data set; and projecting the resultant intermediate volume data set along the view direction.

Using an intermediate mapping transform in this way, for example an intermediate transform matrix provides for a convenient and efficient algorithm for projecting the volume data.

Appropriate intermediate and warp mapping transforms can be determined by factorisation of a view mapping transform corresponding to a selected view point and view direction. This ensures the combined effect of the intermediate and warp mapping transforms provides for an output image which corresponds to the view mapping transform.

In one example, the step of projecting the volume data set along the view direction further comprises: determining an auxiliary translation mapping transform for translating the intermediate volume data to a shifted intermediate volume data set in which centres of voxels project to a first predetermined offset from the centres of pixels in the intermediate image in a direction parallel to the first intermediate-image axis and to a second predetermined offset from the centres of pixels in the intermediate image in a direction parallel to the second intermediate-image axis; applying the auxiliary translation mapping transform to the intermediate volume data set; projecting the resultant shifted intermediate volume data set along the view direction; and applying the inverse of the auxiliary translation mapping transform to provide the intermediate image.

This ensures that rays cast through the volume data set during projecting pass at consistent distances from voxel centres for all view points and view directions. For example, the first and second offsets may be zero such that the centres of voxels project onto the centres of intermediate image pixels for all view points and view directions. This can assist in providing a consistent brightness to output images rendered from different view points and view directions. This can be helpful, for example, where an animated sequence of different output images of the same volume data set is to be made, for example where a user manipulates and views volume data in real time.

The integer number of pixels separating voxel centres along the first intermediate-image axis may be a rounded value of the magnitude of a projection of the separation between neighbouring voxels along one of the two of the first, second and third directions on to the output image and the integer number of pixels separating voxel centres along the second intermediate-image axis may be a rounded value of the magnitude of a projection of the separation between neighbouring voxels along the other of the two of the first, second and third directions onto the output image.

Furthermore, the two of the first, second and third directions may be those which are least parallel with the view direction.

This approach can provide for an intermediate image which most closely matches the output image. This ensures the overall projecting conditions closely correspond with those that would be used were the output image to be conventionally rendered, e.g. with a single transform from the volume data set directly to the output image. This helps to minimise secondary artefacts that might be introduced by methods embodying the invention.

According to a second aspect of the invention there is provided a computer program product comprising machine readable instructions for implementing the method of the first aspect of the invention.

The computer program product can be in the form of a computer program on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

According to a third aspect of the invention there is provided a computer configured to perform the method of the first aspect of the invention.

According to a fourth aspect of the invention there is provided an apparatus for generating a two-dimensional output image of a slab MPR volume data set comprising voxels arranged along first, second and third directions from a selectable view direction, the apparatus comprising: a source from which volume data may be retrieved to provide the slab MPR volume data set; a projection processor operable to project the volume data set along the view direction to form an intermediate image having pixels arranged along first and second intermediate-image axes in which neighbouring voxels along two of the first, second and third directions are separated by respective integer numbers of pixels; and a warp processor operable to apply a warp mapping transform to transform the intermediate image into the output image.

This aspect of the invention provides an apparatus capable of performing the method of the first aspect of the invention. The apparatus may, for example, be a suitably programmed general purpose computer workstation. The source may be a network connection, a memory, or a connected imaging modality such as a CT scanner, for example.

According to a fifth aspect of the invention there is provided a method of re-sampling a slab MPR volume data set comprising: providing a volume data set comprising voxels arranged in rows along first, second and third directions; transforming the volume data set to a re-sampled volume data set having re-sampled voxels arranged in rows along first, second and third axes and in which neighbouring voxels along the first, second and third directions in the volume data set are separated by integer numbers of re-sampled voxels along the first, second and third axes in the re-sampled data set.

According to a sixth aspect of the invention there is provided a computer system comprising: a Picture Archiving and Communication System having memory for storing a volume data set; image processing software operable to generate a two-dimensional output image of the volume data set from a selectable view point and view direction according to the first aspect of the invention; and one or more workstations operable to access the memory and retrieve the volume data sets, and implement the image processing software.

The above identified hatch artefact can also arise in rendering processes other than slab MPR rendering and according to seventh aspect of the invention there is provided a method of generating a two-dimensional output image of a volume data set from a selectable view point and view direction in an orthographic projection rendering process or a ray casting rendering process in which rays are cast parallel to the view direction or a three-dimensional textured plane rendering process, the method comprising: providing a volume data set comprising voxels arranged in rows along first, second and third directions; and projecting the volume data set along the view direction to form an intermediate image having pixels arranged along first and second intermediate-image axes in which the projection of neighbouring voxels along two of the first, second and third directions are separated by respective integer numbers of pixels; and applying a warp mapping transform to transform the intermediate image to the output image.

It will be appreciated that the optional features described above in connection with the first aspect of the invention are also applicable to the seventh aspect of the invention.

According to an eighth aspect of the invention there is provided a computer program product comprising machine readable instructions for implementing the method of the seventh aspect of the invention.

According to a ninth aspect of the invention there is provided a computer configured to perform the method of the seventh aspect of the invention.

According to a tenth aspect of the invention there is provided an apparatus for performing an orthographic projection rendering process or a ray casting rendering process in which rays are cast parallel to the view direction or a three-dimensional textured plane rendering process for generating a two-dimensional output image of a volume data set comprising voxels arranged along first, second and third directions from a selectable view direction, the apparatus comprising: a source from which a volume data set may be retrieved; a projection processor operable to project the volume data set along the view direction to form an intermediate image having pixels arranged along first and second intermediate-image axes in which neighbouring voxels along two of the first, second and third directions are separated by respective integer numbers of pixels; and a warp processor operable to apply a warp mapping transform to transform the intermediate image into the output image.

The method of the seventh aspect of the invention and/or the apparatus of the tenth aspect of the invention may be incorporated into a Picture Archiving and Communication System.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1A:
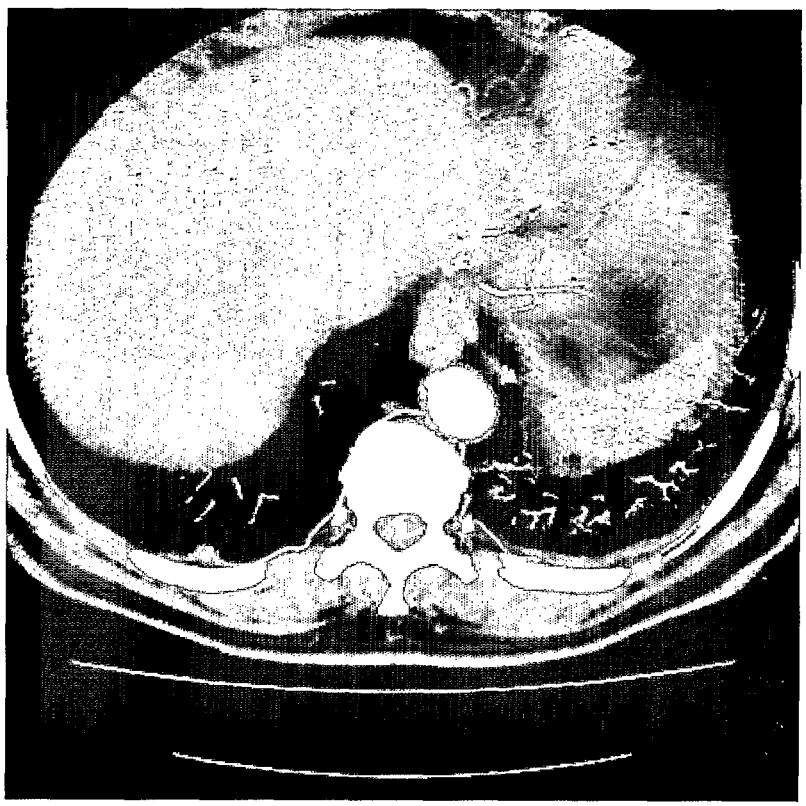
FIG. 1A schematically shows a medical image having an artefact which occurs with known volume rendering techniques.
Figure 1B:
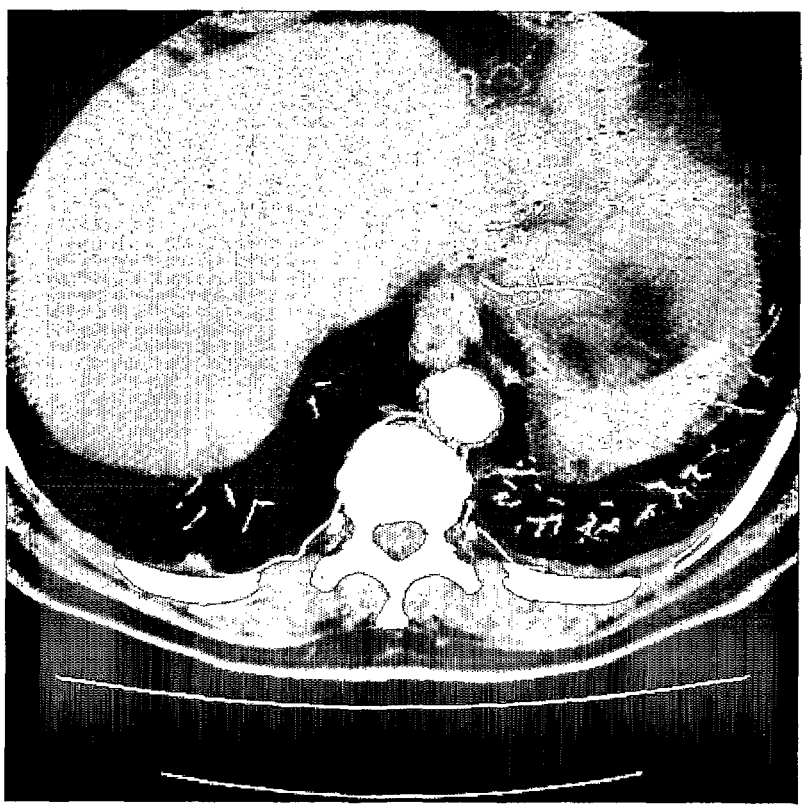
FIG. 1B-1D schematically show images similar to that of FIG. 1A which have been rendered from different directions.
Figure 1C:
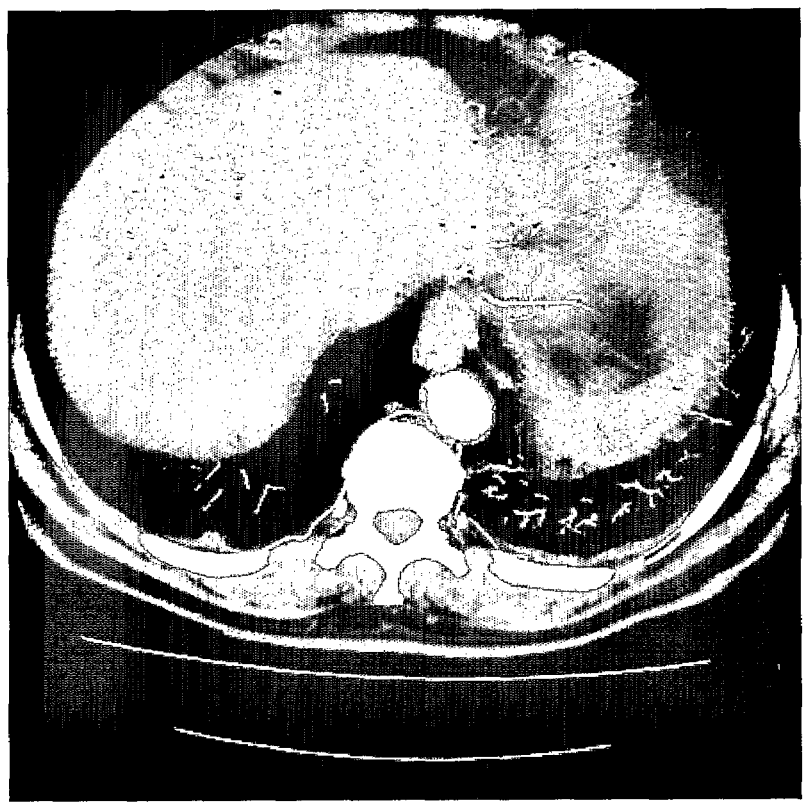
Figure 1D:
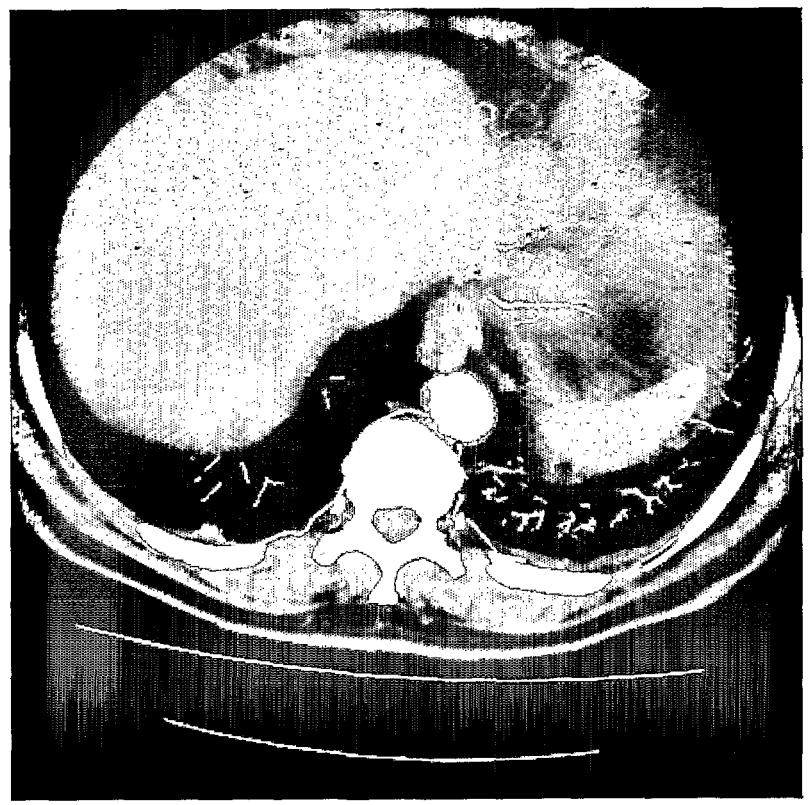
Figure 2:
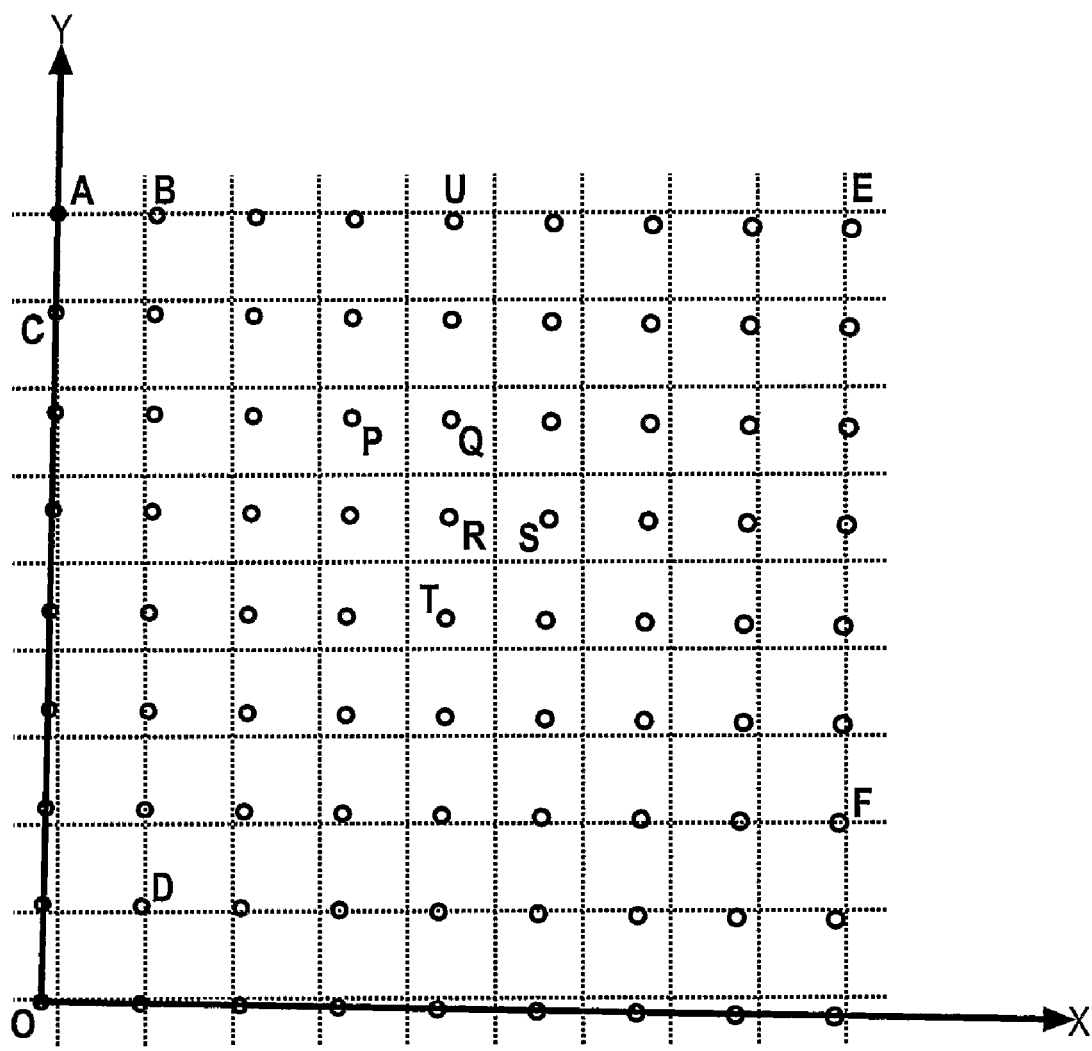
FIG. 2 schematically shows a section of one slice of an MPR slab formed during a known process of rendering volume data to create images of the kind shown in FIGS. 1A-D.
Figure 3:
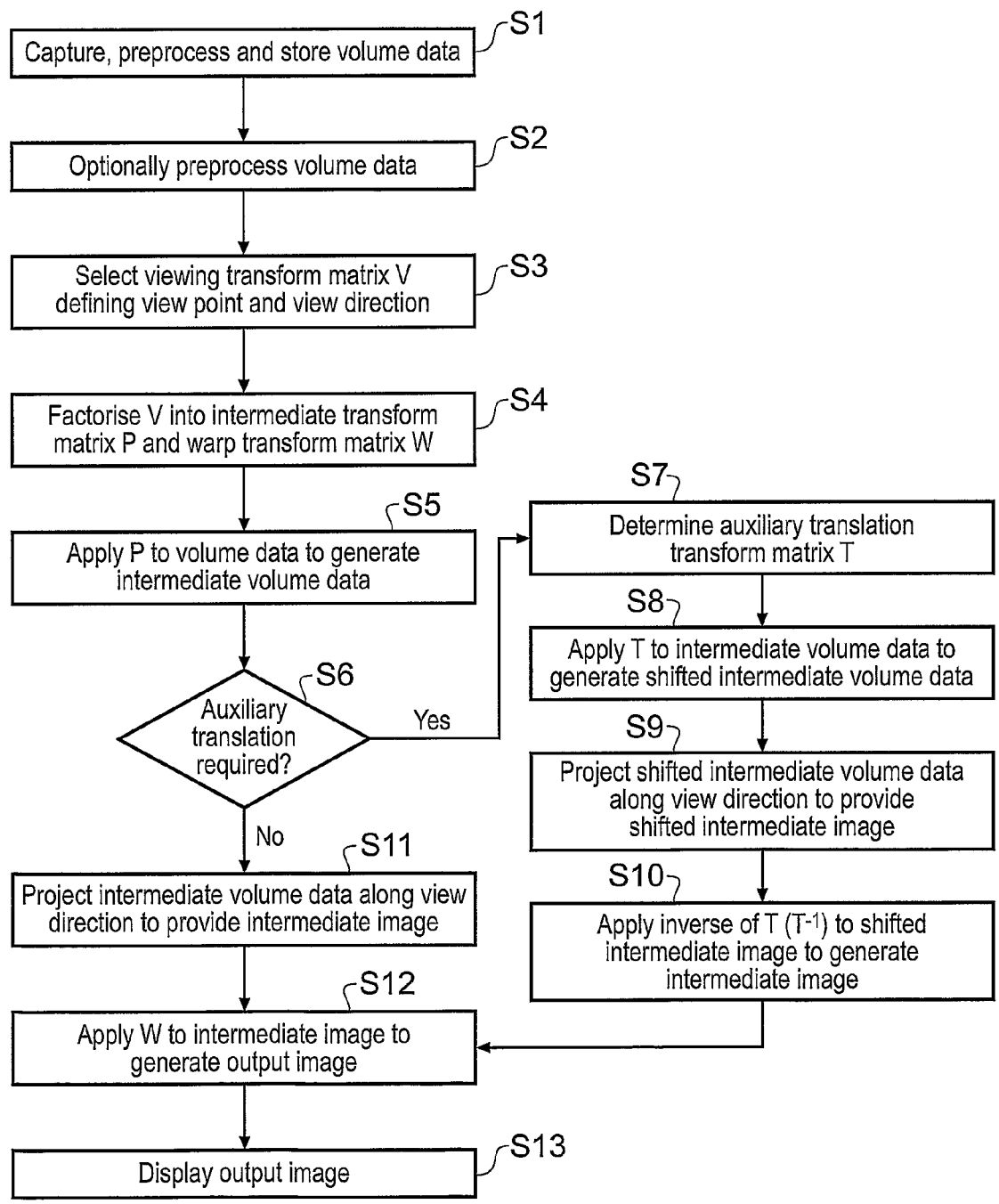
FIG. 3 is a flow chart schematically showing processing stages in generating a two-dimensional output image of volume data from a selectable view point and view direction according to an embodiment of the invention.
Figure 4A:
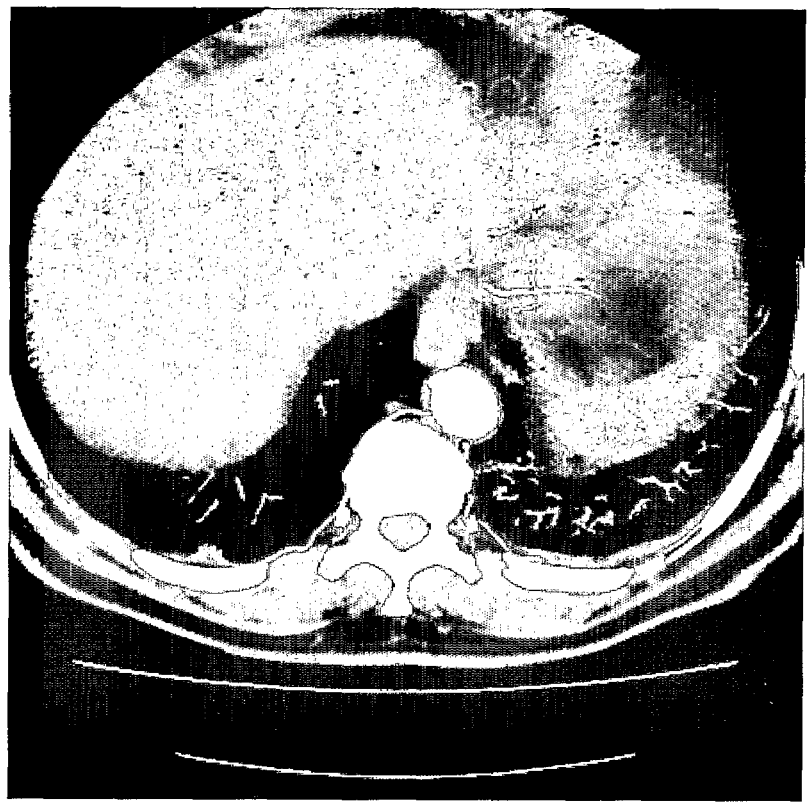
FIGS. 4A-D schematically show medical images similar to those of FIGS. 1A-D which have been rendered according to an embodiment of the invention.
Figure 4B:
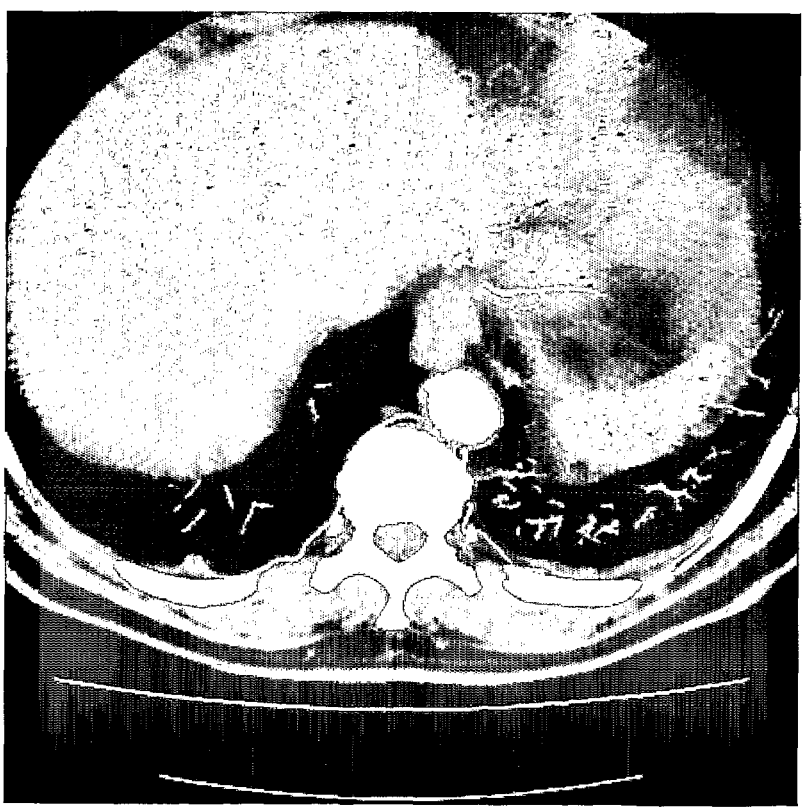
Figure 4C:
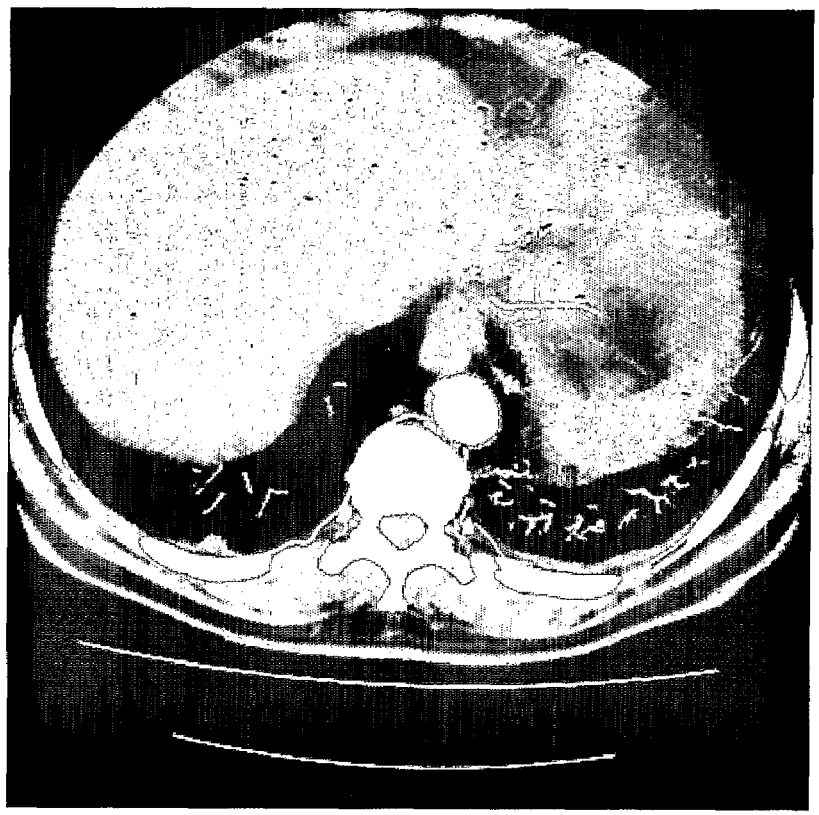
Figure 4D:
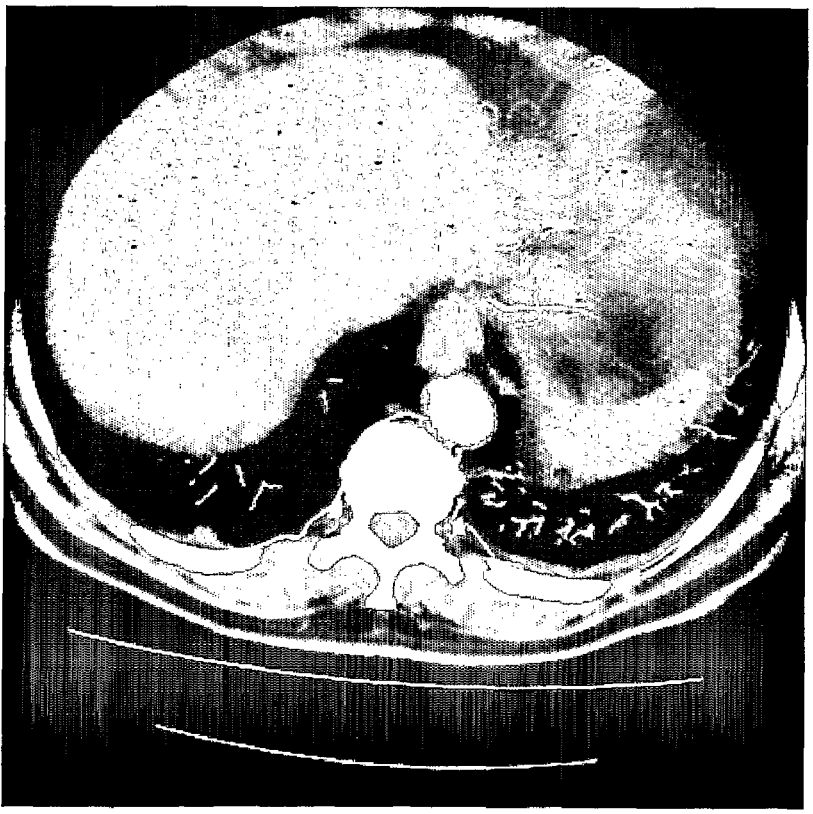

FIG. 3 is an overview of the processing stages in operating an embodiment of the invention to generate a 2D output image of slab MPR volume data from a selectable view point and view direction. Slab MPR volume data are volume data comprising multiple MPR planes. The method may execute on a suitably programmed general purpose computer workstation, for example.

In step S1, raw volume data are captured by suitable capture apparatus and preprocessed and stored. The raw volume data could be captured, for example, by a computer tomographic scanner, a nuclear resonance scanner or an ultrasound scanner, etc. The data are preprocessed to generate volume data in the form of a three-dimensional array of voxel values. This may include, for example, normalisation from capture apparatus units to conventional units and mapping of data not captured on a regular voxel grid to a regular grid. The data may be stored in a random access memory of the capture apparatus for immediate further processing. However, in general the data will be stored in a storage device, such as a hard disk, for later retrieval and processing. This allows other apparatus, for example remote computer workstations connected to the storage, to perform the processing at a later time.

The volume data are, as described above, arranged in rows running parallel to three orthogonal axes I, J, K. Neighbouring voxels are separated along each of the directions corresponding to these axes by unit vectors. That is to say, the distance between voxel centres along each of the axes is unity. Again as described above, a view-space coordinate system X, Y, Z is defined in which neighbouring pixels in the output image are separated along the X- and Y-axes by unit vectors x, y and the Z-axis is aligned with the view direction.

In step S2, the volume data are retrieved and optionally preprocessed. The optional preprocessing may include, for example, selecting a sub-region from the volume data for further processing or ignoring voxels having a selected value (padding value).

In step S3, a view transform matrix V corresponding to a desired view point and view direction is defined using conventional techniques. In this example, the view transform matrix V is a conventional homogenous transform matrix of the following form:

$$V = \begin{pmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{pmatrix}$$

This is the matrix transform which would conventionally be applied to the volume data before projecting the volume data along the view direction to generate an output image.

In step S4, the view transform matrix V is factorised into an intermediate transform matrix P and a warp transform matrix W such that:

V=PW

The factorisation of V into P and W is made to satisfy the following conditions. Firstly, unit vectors i, j, k in volume space are transformed by the view transform matrix to provide vectors i', j' and k' respectively. That is to say (again using homogenous notation but assuming for simplicity that there is no translation component (i.e. $V_{41}$, $V_{42}$, etc.=0)):

$$i' = iV$$
$$= (1\ 0\ 0\ 1) \begin{pmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{pmatrix}$$
$$= (V_{11}\ V_{12}\ V_{13}\ V_{14})$$

$$j' = jV$$
$$= (0\ 1\ 0\ 1) \begin{pmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{pmatrix}$$
$$= (V_{21}\ V_{22}\ V_{23}\ V_{24});$$

and $$k' = kV$$
$$= (0\ 0\ 1\ 1) \begin{pmatrix} V_{11} & V_{12} & V_{13} & V_{14} \\ V_{21} & V_{22} & V_{23} & V_{24} \\ V_{31} & V_{32} & V_{33} & V_{34} \\ V_{41} & V_{42} & V_{43} & V_{44} \end{pmatrix}$$
$$= (V_{31}\ V_{32}\ V_{33}\ V_{34}).$$

The two of these vectors which are most closely aligned with the image plane (i.e. the XY-plane in view-space) are determined. This may be done using conventional vector algebra, for example by selecting the two of i', j' and k' for which their inner product with a vector aligned with the view direction is smallest. The two selected vectors will be denoted as r' and c' for which the corresponding vectors in volume-space are r and c. For example, if i' and k' are the two vectors most closely aligned with the image plane in view space, then r=i, r'=i', c=k, and c'=k'.

Next, the magnitudes of r' and c' projected onto the image plane (i.e. the xy-plane in view space) are determined; again this can be done using conventional vector algebra. These magnitudes are E and F respectively in view-space units. Rounded values of E and F are then determined. These rounded values are A and B respectively. In this example, A and B are the nearest non-zero integers to E and F. However, other techniques, such as determining the floor (rounding down) or the ceiling (rounding up) of E and F, may also be used. Once A and B have been determined, the intermediate transform matrix P and the warp transform matrix W are defined such that:

rP=(A 0 R'$_z$ R$_T$');

cP=(0 B C'$_z$ C'$_T$);

where R'$_z$, and C'$_z$ are the third elements of r' and c' respectively and R'$_T$, and C'$_T$ are the fourth elements of these vectors, and such that:

V=PW.

Returning to FIG. 3, following the factorisation of V into P and W, in step S5, P is applied to the volume data. This transforms the volume data to intermediate volume data in an intermediate space. The intermediate space has three axes L, M, N. The L- and M-axes are parallel to the XY-plane in view space. The L- and M-axes will not, in general, be orthogonal to one another in view space. The N-axis is aligned parallel with the view direction. An intermediate-space coordinate system is used to identify the location of each voxel in intermediate space. The intermediate-space coordinate system has unit vectors l, m and n which are aligned with respective ones of the axes L, M and N. The unit vector l is defined such that the projection of rP onto the LM-plane has magnitude A. The unit vector m is defined such that the projection of cP onto the LM-plane has magnitude B.

In step S6, a determination of whether an auxiliary translation is required is made. The auxiliary translation will be discussed further below. It will be appreciated that in implementations in which an auxiliary translation transform matrix is always (or never) to be applied, there is no need for the determination step S6. For the time being it will be assumed that no auxiliary translation is required and the processing follows the "NO" branch from step S6 to step S11.

In step S11, the intermediate volume data are projected along the view direction (i.e. N-axis in intermediate space) to form an intermediate image. The intermediate image has pixels arranged in lines parallel to the L- and M-axes. As noted above, these lines will not in general be orthogonal to one another in view space. Pixel centres in the intermediate image are separated by the unit vector l and m respectively along each of these axes. The projection may be made according to any desired projection algorithm. In this example, a maximum intensity projection algorithm is used. As noted above, this involves casting a ray from each pixel in the intermediate image through the intermediate volume data and determining the maximum voxel value it intersects. It will be appreciated that although the intermediate image may be considered a 'real' image in that it comprises processed pixel values, for example, stored in a memory, the intermediate volume space is a virtual space.

As described above, the intermediate transform matrix P is designed such that it transforms a unit vector (i.e. the separation between neighbouring voxel centres) along the volume-space axes corresponding to r and c such that they project to an integer number of pixels along the L- and M-axes respectively. This means rays cast through the transformed volume data from each of the pixels in the intermediate image pass at consistent distances from voxel centres throughout planes of the intermediate volume data which are parallel to the plane of the intermediate image. These planes are referred to here as intermediate MPR planes. This means there is a consistency in the interpolations made between voxels when performing the projection for all pixels in the intermediate image.

Where A and B are both unity, rays cast from neighbouring pixels in the intermediate image pass the same distance from their nearest voxel centre throughout each of the intermediate MPR slices through which they pass. Because of this, the periodic beating between sample locations (i.e. the positions of rays cast through the volume data) and voxel locations that gives rise to the hatch artefact shown in FIGS. 1A to 1D does not occur in the intermediate image. This means the intermediate image is free of this artefact.

If, on the other hand A and B are greater than unity, for example 2, rays cast from neighboring pixels will be offset by different amounts from their nearest voxel centre. However, rays from every other pixel will be offset by the same distance. Rays from the intervening pixels pass midway between them. Similarly, if A or B were 3, it would be every third ray that was offset by the same distance. In these situations, each voxel in each intermediate MPR slice is sampled by more than one ray. This is likely to occur, for example, where the output image is highly zoomed such that it becomes limited by the voxel resolution. In these cases there is a slight artefact due to the excess sampling, but since this occurs on the scale of individual voxels it averages out on this scale.

In step S12, the warp transform matrix W is applied to the intermediate image. Because V=PW, this transforms the intermediate image to the desired output image. The intermediate image is distorted and application of the warp transform matrix W corrects this.

In step S13, the output image is displayed, for example on a display of a computer workstation on which the method is performed.

FIGS. 4A-D schematically show medical images which are similar to and correspond to respective ones of the images shown in FIG. 1A-D. The images of FIGS. 4A-D correspond to the same volume data viewed from the same view points and view directions as the images of FIGS. 1A-D. However, for FIGS. 4A-D, the volume rendering is performed according to the method shown in FIG. 3. It can be seen that although the overall appearances of the images rendered in this way are similar to the conventionally rendered images, the hatch artefact is not present. Accordingly, images rendered according to embodiments of the invention do not have the visually distracting artefact. This allows for easier interpretation of images and with a reduced chance of confusion arising due to the presence of artefacts.

In its homogenous form, the view transform matrix V defines both an orientation of a viewing direction and an offset in viewing direction (i.e. a translation of the view point). The translation component is given by the fourth row of V. This row is preserved in the definition of the intermediate transform matrix P. Accordingly, Step S5 of FIG. 3 incorporates the desired translation component of V. The translation component does not affect the separations of voxel centres mapped to the intermediate image. This means the integer relationship between pixel separations in the intermediate image and the voxels is preserved regardless of the magnitude of any translation. The translation component does, however, determine what the consistent offsets are between the voxel centres mapped to intermediate image space and the intermediate image pixel centres. Although the hatch artefact does not depend on the magnitude of this offset, the overall image brightness can do so. For example, if the offset is zero, all rays pass through voxel centres. If the offset corresponds to one-half of the separation between neighbouring voxels, all rays pass half-way between voxel centres. For a maximum intensity projection, this latter case will result in a slightly dimmer image. Generally it is desirable to avoid this effect, and this can be done by applying an auxiliary translation transform matrix T. This is illustrated by the "YES" branch from step S6 in FIG. 3 which leads to carrying out steps S7 to S10 as now described.

In step S7, the auxiliary translation transform matrix T is determined. T is designed to translate the intermediate volume data along each of its axes such that voxel centres map to a pre-determined offset from pixel centres, for example zero offset. This can be achieved, for example by defining T such that:

$$T = \begin{pmatrix} 1 & 0 & 0 & 0 \\ 0 & 1 & 0 & 0 \\ 0 & 0 & 1 & 0 \\ -\partial m & -\partial n & -\partial l & 1 \end{pmatrix}$$

where $\partial m$, $\partial n$ and $\partial l$ are the fractional parts of $V_{41}$, $V_{42}$ and $V_{43}$ respectively.

In step S8, the auxiliary translation transform matrix T is applied to the intermediate volume data to generate shifted intermediate volume data.

In step S9, the shifted intermediate volume data are projected along the view direction to form a shifted intermediate image. Step S9 is similar to and will be understood from step S11 which is described above.

In step S10, the inverse ($T^{-1}$) of the auxiliary translation transform matrix T is applied to the shifted intermediate image to provide an intermediate image corresponding to that generated in step S11. Processing then continues with steps S12 and S13 as described above.

The auxiliary translation transform matrix T ensures that voxel centres map to the same offset from pixel centres during the projection at step S9, irrespective of the magnitude of any translation (pan) component. Because of this, output images corresponding to different translations will not be affected by changes in intensity. This can be helpful, for example where a number of output images having different translation components are to be directly compared or animated into a time sequence. For example in response to a user selecting different view points and view directions in real time. Without the auxiliary translation transform matrix, such a time sequence might appear to brighten and darken between successive frames.

To show the differences in processing depending on whether an auxiliary translation transform matrix is or is not to be employed, the above description has described applying the auxiliary translation transform matrix T as a separate processing step. It will be appreciated, however, that in general some steps of the method shown in FIG. 3 can be combined. Furthermore, they need not all be performed in the order shown in the figure, nor need all of the steps be performed in some implementations. For example, a determination that an auxiliary transform is required (step S6) may be made at the outset. Perhaps because it is already known that the rendered output image will form part of an animated sequence. In this case, the P and T matrices can be multiplied together and applied to the volume data in one step. Similarly, $T^{-1}$ and W can be multiplied together and applied in one step.

One way of factorising the view transform matrix V into an appropriate intermediate transform matrix P and warp transform matrix W will now be described by way of example. It will be appreciated, however, that P and W will not in general represent unique solutions to the factorisation of V, and that other techniques may be employed.

First, W is defined as follows:

$$W = \begin{pmatrix} \frac{R'_x}{A} & \frac{R'_y}{A} & 0 & 0 \\ \frac{C'_x}{B} & \frac{C'_y}{B} & 0 & 0 \\ 0 & 0 & 1 & 0 \\ 0 & 0 & 0 & 1 \end{pmatrix}$$

where $R'_x$, and $C'_x$ are the first elements of r' and c' respectively and $R'_y$, and $C'_y$ are the second elements of these vectors.

The inverse ($W^{-1}$) of W is then determined using conventional matrix algebra. It is then possible to determine P by a simple multiplication, namely:

$$P=VW^{-1}$$

It will be appreciated that what has been referred to above as an output image could be an image which is to be subject to further image processing before being displayed to a user. For example, the image may be filtered or have its contrast enhanced before display. In other cases, the image may be compressed, transmitted, and reconstituted. MPR images may also be generated as described above for a range of viewpoints (such as a range of Z positions for the image plane) and aggregated to form an output volume data set. This output volume data set may then be stored, transmitted, segmented, or rendered using the process described above or other techniques.

It will also be appreciated that while the above described embodiments have employed matrix transforms, this is for convenient illustration only. It will be understood that different mapping algorithms based on other mathematical notations may be used which still provide for a projection of the volume data to an intermediate image in which separations between neighbouring voxels project to an integer number of pixels in the intermediate image.

Although the above description has been described in the context of MPR, methods according to the invention are also applicable to other rendering processes (algorithms). In particular, processes in which volume data are sampled on a rectilinear grid (sample grid) which is in general not aligned with a volume-space coordinate system, and where correlation of sample locations along an axis of the sample grid with voxels along an axis of the volume-space coordinate system gives rise to a bias error affecting the value of image pixels. Known types of projection to which this applies include, but are not limited to: orthographic projection with maximum intensity (also known as MIP), or minimum intensity (MinIP) accumulation and orthographic projection with a mapping of voxel value to colour and opacity.

As described above, the method may be applied to MPR rendering with thickness (also known as slab MPR rendering). It may also be applied to rendering that is not bound by MPR planes, such as projection of a whole volume data set, or a subset of volume data.

Sampling algorithms to which the method may be applied include, but are not limited to: ray casting with parallel rays cast along a viewing direction; Sampling along cross-sectional planes, also known as 3D textured planes, which are perpendicular to a given direction (again, commonly known as the viewing direction). It is noted that these two sampling algorithms are isomorphic. That is to say, the algorithms process (or can be configured to process) the same set of samples of volume data and differ only in the order of processing those samples.

The method may also be applied in a situation where an image is an intermediate image which is further rendered or resampled, for example where the intermediate image is scaled, rotated, and/or undergoes a pixel value transformation before being presented as a final image to a user.

The method may also be applied when the output is not an image but a resampled 3D array (a second volume) or a stack of 2D images, used for further processing and display. One example of applying the method to resampling of a volume or stack of images is preparing a series of cross sectional images separated by an offset perpendicular to their planes. Another example is preparing a resampled volume as an intermediate result of a multi-stage volume rendering.

Figure 5:
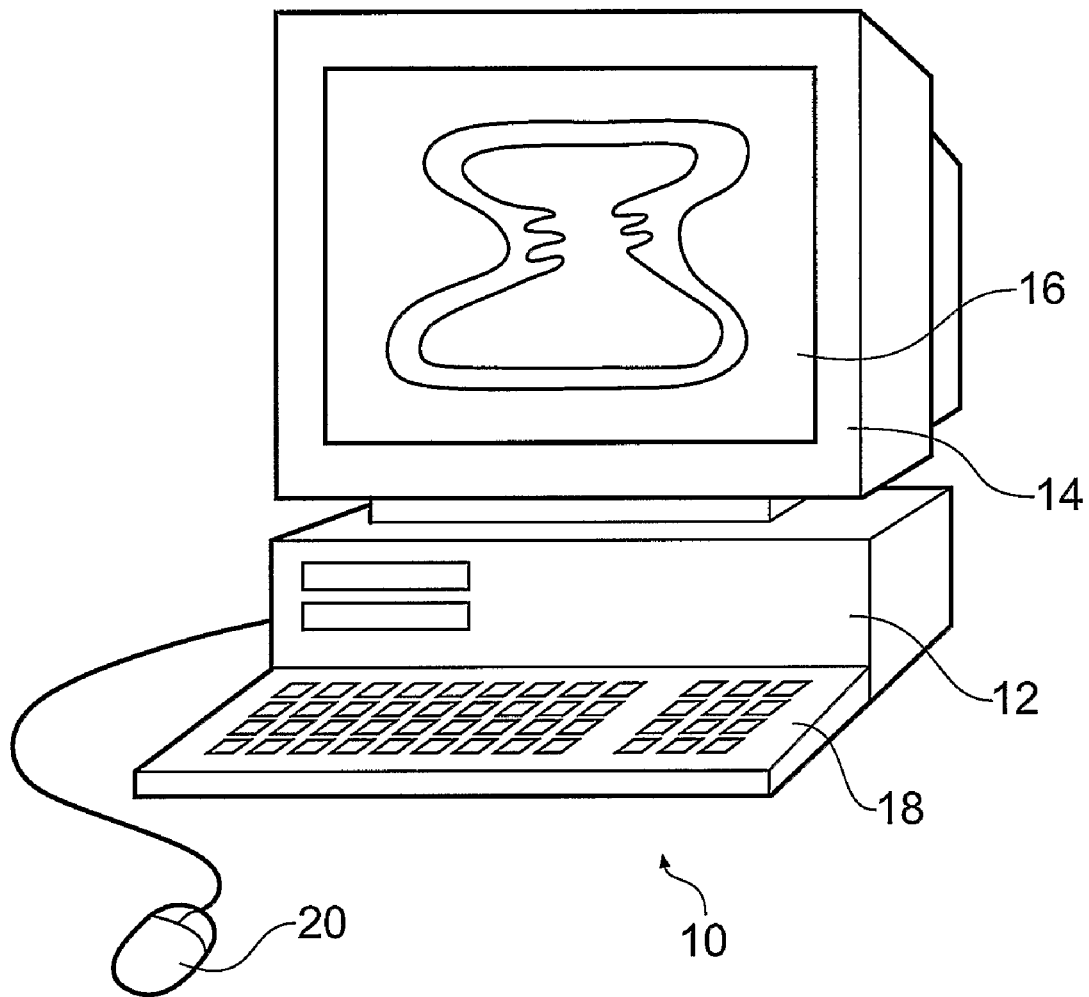
FIG. 5 shows a schematic representation of a computer workstation used to provide one embodiment of the invention.

FIG. 5 is a schematic representation of a computer workstation 10 which may be used to used to provide embodiments of the invention. As shown in FIG. 5, the computer workstation 10 includes a system unit 12, a display 14 (as shown displaying an image derived from volume data in accordance with an example of the invention), a keyboard 18 and a mouse 20. Although methods according to the invention may be executed on a suitably programmed general purpose computer, for example a personal computer or other form of computer workstation, it will be appreciated that other implementations are possible. For example, in an embodiment of the invention, a network of computers, rather than on a stand-alone computer may be used. Alternatively, or in addition, at least some of the functionality of the invention may be implemented by means of special purpose hardware, for example in the form of a graphics processing unit (GPU), special purpose integrated circuits (e.g., Application Specific Integrated Circuits (ASICs) or Field Programmable Gate Arrays (FPGAs)), or firmware.

Methods embodying the invention will often be used within a hospital environment. In this case, the methods may usefully be integrated into a stand-alone software application, or with a Picture Archiving and Communication System (PACS). A PACS is a hospital-based computerised network which can store diagnostic images of different types (including 3D volume data sets such as those from CT and magnetic resonance imaging (scanning) in a digital format organised in a single central archive. For example, images may be stored in the Digital Imaging and Communications in Medicine (DICOM) format. Each image has associated patient information such as the name and date of birth of the patient also stored in the archive. The archive is connected to a computer network provided with a number of workstations, so that users all around the hospital site can access and process patient data as needed. Additionally, users remote from the site may be permitted to access the archive over the Internet.

In the context of the present invention, therefore, a plurality of image volume data sets can be stored in a PACS archive, and a computer-implemented method of generating a 2D output image of a chosen one of the volume data sets from a selectable view direction can be provided on a workstation connected to the archive via a computer network. A user such as a surgeon, a consultant, or a researcher can thereby access any volume data set from the workstation, and generate and display images using methods embodying the invention.

Figure 6:
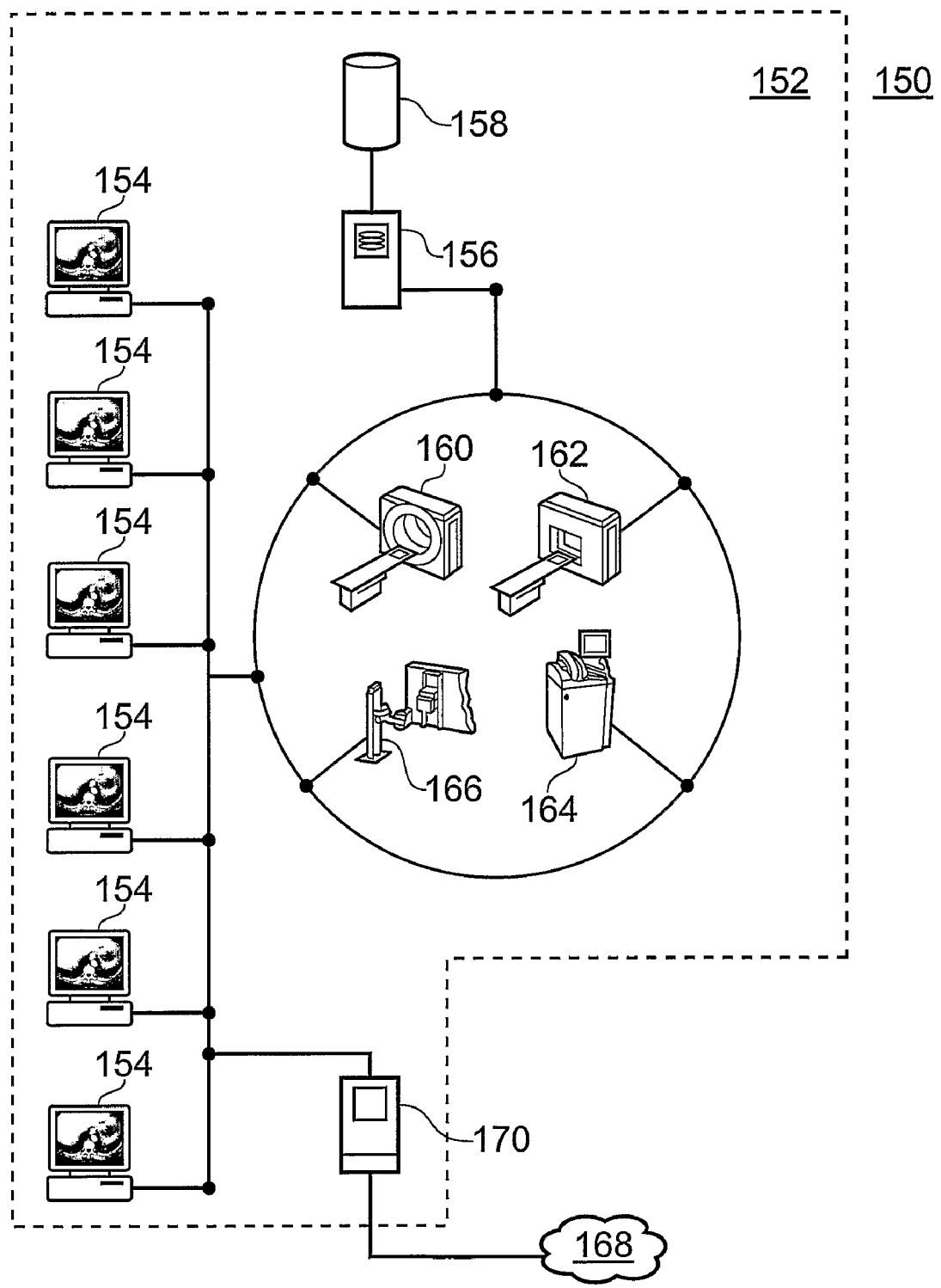
FIG. 6 schematically shows an example hospital computer network which can be used in conjunction with embodiments of the invention.

FIG. 6 shows an example computer network which can be used in conjunction with embodiments of the invention. The network 150 comprises a local area network in a hospital 152. The hospital 152 is equipped with a number of workstations 154 which each have access, via the local area network, to a hospital computer server 156 having an associated storage device 158. A PACS archive is stored on the storage device 158 so that data in the archive can be accessed from any of the workstations 154. One or more of the workstations 154 has access to software for computer-implementation of methods of generating images as described hereinbefore. The software may be stored locally at the or each workstation 154, or may be stored remotely and downloaded over the network 150 to a workstation 154 when needed. In other example, methods embodying the invention may be executed on the computer server with the workstations 154 operating as terminals. For example, the workstations may be configured to receive user input defining a desired volume data set and view direction and to display a resulting image while the volume rendering itself is performed by the server, or other processor. Also, a number of medical imaging devices 160, 162, 164, 166 are connected to the hospital computer server 156. Volume data collected with the devices 160, 162, 164, 166 can be stored directly into the PACS archive on the storage device 156. Thus a patient image can be generated and viewed immediately after it is recorded, so that a swift diagnosis can be obtained in the event of medical emergency. The local area network is connected to the Internet 168 by a hospital Internet server 170, which allows remote access to the PACS archive. This is of use for remote accessing of the data and for transferring data between hospitals, for example, if a patient is moved, or to allow external research to be undertaken.

In the described embodiments, a computer implementation employing computer program code for storage on a data carrier or in memory can be used to control the operation of the processor of the computer. The computer program can be supplied on a suitable carrier medium, for example a storage medium such as solid state memory, magnetic, optical or magneto-optical disk or tape based media. Alternatively, it can be supplied on a transmission medium, for example a medium with a carrier such as a telephone, radio or optical channel.

It will be appreciated that although particular embodiments of the invention have been described, many modifications/additions and/or substitutions may be made within the scope of the present invention. Accordingly, the particular examples described are intended to be illustrative only, and not limitative.

Thus, for example, although the described embodiments employ a computer program operating on a conventional computer, for example a conventional computer workstation, in other embodiments special purpose hardware could be used. For example, at least some of the functionality could be effected using special purpose circuits, for example a field programmable gate array (FPGA) or an application specific integrated circuit (ASIC) or in the form of a graphics processing unit (GPU). Also, multi-thread processing or parallel computing hardware could be used for at least some of the processing. For example, different threads or processing stages could be used to generate respective alternate rows of the intermediate image.

REFERENCES

[1] Philippe Lacroute, Ph. D. dissertation, Technical Report CSL-TR-95-678, Stanford University, 1995
[2] U.S. Pat. No. 5,787,889 (University of Washington)
[3] U.S. Pat. No. 6,658,080 (Voxar Limited)

The invention claimed is:

1. A computer-implemented method of generating a two-dimensional output image of a volume data set from a selectable view point and view direction in a slab multi-planar reformatting (MPR) rendering process, the method comprising:
providing a volume data set comprising voxels arranged in rows along first, second and third directions;
projecting the volume data set along the view direction on to a plane to form an intermediate image having pixels arranged along first and second intermediate-image axes in which the projection of neighbouring voxel centres along two of the first, second and third directions are separated by respective integer numbers of the separation between pixels; and
applying a warp mapping transform to transform the intermediate image to the output image; and
wherein the plane of the intermediate image is parallel to the plane of the output image, and
the step of projecting the volume data set along the view direction comprises:
determining an intermediate mapping transform for transforming the volume data set to an intermediate volume data set in which the voxels are arranged in rows running parallel to the first intermediate-image axis, the second intermediate-image axis and the view direction;
applying the intermediate mapping transform to the volume data set; and
projecting the resultant intermediate volume data set along the view direction.

2. A method according to claim 1, wherein the intermediate mapping transform and the warp mapping transform are determined by factorising a view mapping transform corresponding to a selected view point and view direction.

3. A method according to claim 1, wherein the step of projecting the volume data set along the view direction further comprises:
determining an auxiliary translation mapping transform for translating the intermediate volume data set to a shifted intermediate volume data set in which centres of voxels project to a first predetermined offset from the centres of pixels in the intermediate image in a direction parallel to the first intermediate-image axis and to a second predetermined offset from the centres of pixels in the intermediate image in a direction parallel to the second intermediate-image axis;
applying the auxiliary translation mapping transform to the intermediate volume data set;
projecting the resultant shifted intermediate volume data set along the view direction; and
applying the inverse of the auxiliary translation mapping transform to provide the intermediate image.

4. A method according to claim 3, wherein the first and second offsets are zero.

5. A method according to claim 1, wherein the respective integer numbers of pixels are rounded values of the magnitudes of a projection of the separation between neighbouring voxels along the two of the first, second and third directions on to the output image.

6. A method according to claim 5, wherein each of the rounded values is the nonzero integer which is closest to the magnitude of the projections of the separations between neighbouring voxels along the two of the first, second and third directions on to the output image.

7. A method according to claim 1, wherein one of the two of the first, second and third directions is the direction which is least parallel with the view direction and the other of the two of the first, second and third directions is the direction which is next least parallel with the view direction.

8. A computer program product comprising a non-transitory computer-readable storage medium on which are stored machine readable instructions for implementing the method of claim 1.

9. A computer comprising a memory containing software operable to perform the method of claim 1, and a processor for implementing said method.

10. An apparatus for generating a two-dimensional output image of a volume data set comprising voxels arranged along first, second and third directions from a selectable view direction, the apparatus comprising:
   a source from which volume data may be retrieved to provide the volume data set;
   a projection processor operable to project the volume data set along the view direction on to a plane to form an intermediate image having pixels arranged along first and second intermediate-image axes in which the projection of neighbouring voxel centres along two of the first, second and third directions are separated by respective integer numbers of the separation between pixels; and
   a warp processor operable to apply a warp mapping transform to transform the intermediate image into the output image; and
   wherein the plane of the intermediate image is parallel to the plane of the output image, and
   the projection processor is operative to project the volume data set along the view direction by:
   determining an intermediate mapping transform for transforming the volume data set to an intermediate volume data set in which the voxels are arranged in rows running parallel to the first intermediate-image axis, the second intermediate-image axis and the view direction;
   applying the intermediate mapping transform to the volume data set; and
   projecting the resultant intermediate volume data set along the view direction.

11. A computer system comprising:
   a Picture Archiving and Communication System having memory for storing volume data;
   image processing software operable to generate a two-dimensional output image of the volume data from a selectable view point and view direction according to claim 1; and
   one or more workstations operable to access the memory and retrieve the volume data set, and implement the image processing software.

12. A computer-generated method of generating a two-dimensional output image of a volume data set from a selectable view point and view direction in an orthographic projection rendering process or a ray casting rendering process in which rays are cast parallel to the view direction or a three-dimensional textured plane rendering process, the method comprising:
   providing a volume data set comprising voxels arranged in rows along first, second and third directions; and
   projecting the volume data set along the view direction on to a plane to form an intermediate image having pixels arranged along first and second intermediate-image axes in which the projection of neighbouring voxel centres along two of the first, second and third directions are separated by respective integer numbers of the separation between pixels; and applying a warp mapping transform to transform the intermediate image to the output image; and
   wherein the plane of the intermediate image is parallel to the plane of the output image, and
   the step of projecting the volume data set along the view direction comprises:
   determining an intermediate mapping transform for transforming the volume data set to an intermediate volume data set in which the voxels are arranged in rows running parallel to the first intermediate-image axis, the second intermediate-image axis and the view direction;
   applying the intermediate mapping transform to the volume data set; and
   projecting the resultant intermediate volume data set along the view direction.

* * * * *